(No Model.)
G. G. MATTHEWS.
KETTLE DRAINER.
No. 434,452. Patented Aug. 19, 1890.
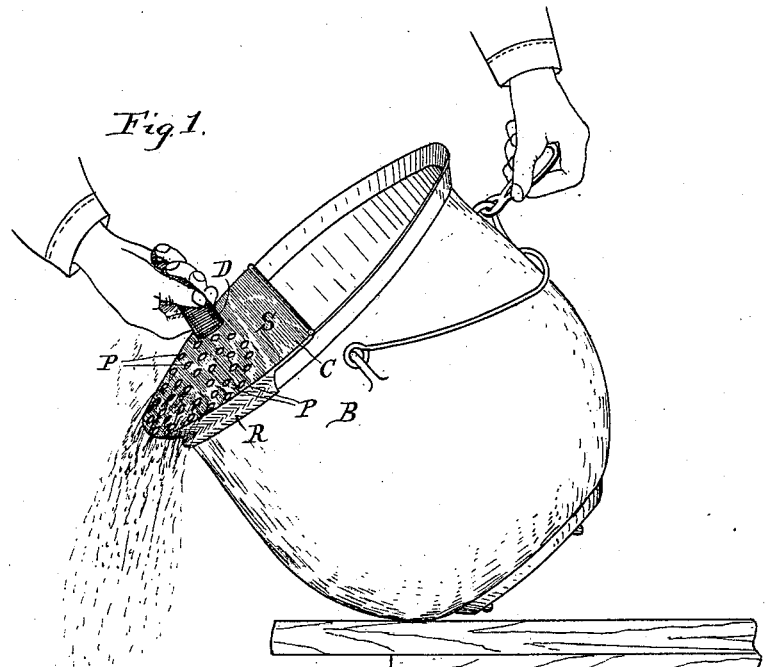
Fig. 1.
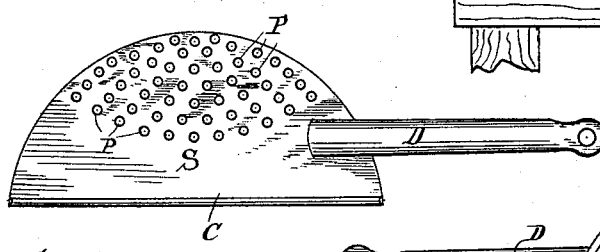
Fig. 2.
Fig. 3.
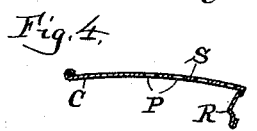
Fig. 4.
Witnesses.
John M. Burton
A. R. Jeserich Jr.
Inventor.
George G. Matthews.
By Wm J Hutchins
Atty.

UNITED STATES PATENT OFFICE.

GEORGE G. MATTHEWS, OF WICHITA, KANSAS.

KETTLE-DRAINER.

SPECIFICATION forming part of Letters Patent No. 434,452, dated August 19, 1890.

Application filed June 10, 1889. Serial No. 313,791. (No model.)

*To all whom it may concern:*

Be it known that I, GEORGE G. MATTHEWS, a citizen of the United States of America, residing at Wichita, in the county of Sedgwick and State of Kansas, have invented certain new and useful Improvements in Kettle-Drainers, of which the following is a specification, reference being had therein to the accompanying drawings and the letters of reference marked thereon, forming a part of this specification, in which—

Figure 1 is a perspective view of my invention applied to a kettle when in use. Fig. 2 is an upper plan view of the drainer. Fig. 3 is an under plan of the same, and Fig. 4 is a central cross-section of the same.

This invention relates to certain improvements in a household utensil adapted to be applied to a kettle or the like for draining the kettle of water or any liquid substance and retaining other substances in the kettle.

It consists of a segmental cover provided with a handle at one side and a depending rim partially surrounding the curved side of the cover, and with a series of perforations in the cover adjacent to and extending a distance from the rim. In use it is applied to one side of a kettle, with its depending rim engaging the outer part of the kettle-rim, and when the kettle is tipped the liquid contents will flow through the perforations.

Referring to the drawings, B represents an ordinary kettle.

S represents the segmental cover of the drainer provided with the perforations P. D represents the handle thereof secured to and extending from one side, and R represents the depending rim of cover S, which is arranged partially surrounding the curved side thereof, as shown.

C represents that portion of cover S which extends beyond the terminal of rim R, and is for the purpose of a guard beyond the perforations P, to prevent the solid substance from falling from the kettle while the liquid substance is being drained off. It is intended that cover-section S be about or nearly a half circle in form, and that rim R be only one-third or less of the circle, for the purpose of better adapting the drainer to accommodate itself to kettles of various sizes, as the difference of curve of kettle-rims of ordinary diameter will but slightly deflect from the segment-rim R when the drainer is made to fit the medium standard kettle by reason of said rim being so short a segment.

In Fig. 1 the drainer is illustrated applied to a kettle when in use, being held in contact with the kettle with one hand while the kettle is tipped with the other hand and the liquid contents of the kettle discharged through the perforation. When the kettle is thus tipped, the rim R of the drainer acts as a support against the kettle-rim to assist in holding and supporting the kettle.

Having thus described my invention, what I claim as new and useful, and desire to secure by Letters Patent, is as follows:

The kettle-drainer consisting of the perforated segmental cover S C, the rim R, partially surrounding the curved side of said cover, and the handle D, extending from one side thereof, substantially as and for the purpose specified.

GEORGE G. MATTHEWS.

Witnesses:
 JACOB BISSAUTZ,
 EDWARD PHILLIPS.